United States Patent
Yang

(10) Patent No.: US 8,907,609 B2
(45) Date of Patent: Dec. 9, 2014

(54) ELECTRONIC DEVICE AND METHOD FOR MONITORING FAN

(71) Applicant: Feng-Chi Yang, New Taipei (TW)

(72) Inventor: Feng-Chi Yang, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 114 days.

(21) Appl. No.: 13/726,617

(22) Filed: Dec. 26, 2012

(65) Prior Publication Data
US 2013/0320904 A1    Dec. 5, 2013

(30) Foreign Application Priority Data
Jun. 4, 2012   (CN) .......................... 2012 1 0180092

(51) Int. Cl.
H02P 29/02    (2006.01)

(52) U.S. Cl.
CPC ..................................... *H02P 29/021* (2013.01)
USPC ................................ 318/490; 318/34; 318/35

(58) Field of Classification Search
CPC .................................................... H02P 29/021
USPC ................................................. 318/490, 34, 35
See application file for complete search history.

(56) References Cited

U.S. PATENT DOCUMENTS 8,140,195 B2* 3/2012 Matteson et al. ............. 700/299

* cited by examiner

*Primary Examiner* — David S Luo

(74) *Attorney, Agent, or Firm* — Novak Druce Connolly Bove + Quigg LLP

(57) ABSTRACT

A method of monitoring a fan of a second electronic device. A first electronic device controls a baseboard management controller (BMC) of the second electronic device to return parameter values, the returned parameter values including temperature values of the second electronic device, and actual speed values of a fan of the second electronic device. The first electronic device records the returned parameter values and returned time of the returned parameter values. Upon acquiring standard speed values corresponding to the temperature values, the first electronic device draws a graph representing a relation between the actual speed values and the determined standard speed values corresponding to the returned time to monitor the fan.

18 Claims, 7 Drawing Sheets

| Time (minute) | Completion time of initialization of a BMC | Boot time of a second electronic device | Temperature values of the second electronic device (°C) | Actual speed values of a fan of the second electronic device (RPS) |
|---|---|---|---|---|
| T | V | | | |
| T+5 | | V | | |
| T+10 | | | 23 | 4800 |

FIG. 4

| Temperature values of the second electronic device (°C) | Standard speed values of the fan of the second electronic device (RPS) |
|---|---|
| <=21 | 3200 |
| 22~28 | 4800 |
| 28~32 | 6400 |
| 32~35 | 8000 |
| 35~40 | 9600 |
| 40~45 | 11200 |
| 45~50 | 12800 |
| 50~55 | 14400 |
| >=55 | 16000 |

FIG. 5

| Time (minute) | Completion time of initialization of the BMC | Boot time of the second electronic device | Temperature values of the second electronic device (°C) | Actual speed values of the fan of the second electronic device (RPS) | Standard speed values of the fan of the second electronic device (RPS) |
|---|---|---|---|---|---|
| T | V | | | | |
| T+5 | | V | | | |
| T+10 | | | 23 | 4800 | 4800 |
| T+15 | | | 30 | 6400 | 6400 |
| T+20 | | | 38 | 9600 | 9600 |
| T+25 | | | 42 | 11200 | 11200 |
| T+30 | | | 48 | 11200 | 12800 |

FIG. 6

ELECTRONIC DEVICE AND METHOD FOR MONITORING FAN

BACKGROUND

1. Technical Field

Embodiments of the present disclosure relate to monitoring technology, and more particularly to a first electronic device and a method for monitoring a fan of a second electronic device using the first electronic device.

2. Description of Related Art

Fan are usually used as cooling units for electronic devices (e.g., a servers or desktop computers) to dissipate heat from one or more components (e.g., a central processing (CPU) unit and/or a hard disk) of the electronic devices. The fan may be controlled to run according to standard speed values to dissipate heat for the one or more components. The standard speed values may be preset corresponding to temperature values of the electronic device.

However, if the fan is not running according to the preset standard speed values (e.g., actual speed values are lower than the preset standard speed values) or not running at all, the electronic device may be damaged. Moreover, when the electronic device is being tested (e.g., function test of the CPU), and the fan runs at a lower speed, or no speed, a test result of the CPU is inaccurate. Therefore, a method for monitoring the fan of the electronic device is desired.

BRIEF DESCRIPTION OF THE DRAWINGS

FIGS. 4~7 are examples of monitoring the fan of the second electronic device according to the monitoring method of FIG. 3.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

In general, the word module, as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
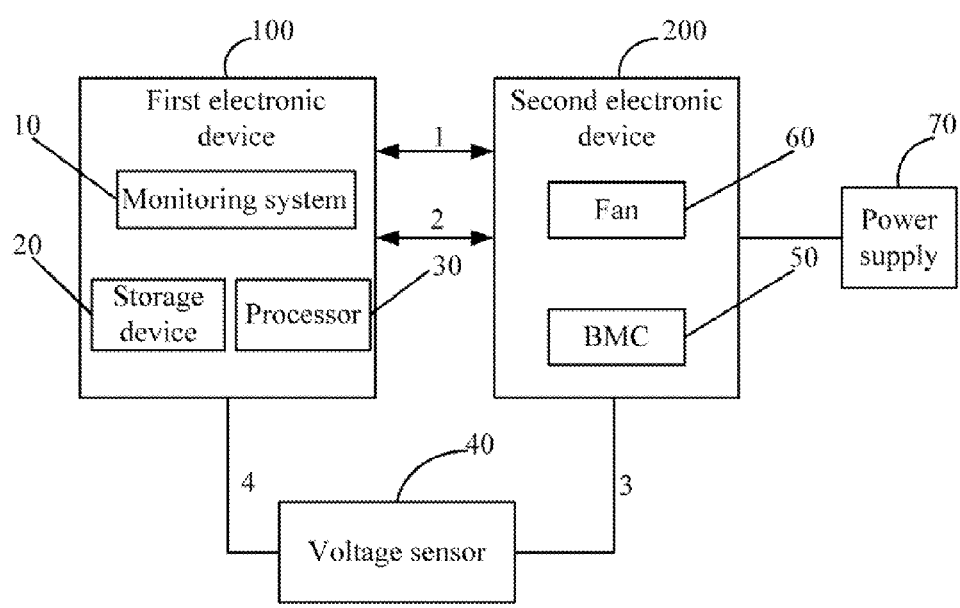
FIG. 1 is a block diagram of one embodiment of a first electronic device including a monitoring system, in communication with a second electronic device which includes a fan.

FIG. 1 is a block diagram of one embodiment of a first electronic device 100 in communication with a second electronic device 200. In the embodiment, the first electronic device 100 and the second electronic device 200 can be computers or servers or a combination.

The first electronic device 100 includes a monitoring system 10, a storage device 20, and at least one processor 30. The second electronic device 200 includes a fan 60, and a baseboard management controller (BMC) 50. A power supply 70 is used to supply power for the second electronic device 200 and the first electronic device 100. The first electronic device 100 and the second electronic device 200 may include more or fewer components than illustrated, or have a different configuration of the various components in other embodiments.

In some embodiments, the monitoring system 10 presets a plurality of standard speed values of the fan 60 corresponding to different temperature values of electronic device 200. As shown in FIG. 5, a fan table which includes a plurality of standard speed values corresponding to different temperature values of the second electronic device 200, is preset and stored in the storage device 30 for the fan 60 by the monitoring system 10. For example, the monitoring system 10 presets a standard speed value (e.g., 6400 revolutions per second (RPS)) of the fan 60 when the temperature values of the second electronic device 200 are within [28° C., 32° C.].

In other embodiments, when the monitoring system 10 presets the fan table for the fan 60, the number of components in the second electronic device 200 which need to be cooled by the fan 60 may be considered. For example, if the fan 60 dissipates heat for one component (e.g., a CPU), the standard speed value corresponding to a temperature value of 29° C. may be preset to be 6400 RPS. If the fan 60 dissipates heat for two components (e.g., the CPU and a hard disk), the standard speed value corresponding to the temperature value of 29° C. may be preset to be 8000 RPS. In this embodiment, the fan table is preset for the fan 60 to dissipate heat for the CPU and other six storage devices.

The fan 60 may be run according to the preset standard speed values to dissipate heat for the components (e.g., the CPU and/or the hard disk) of the second electronic device 200.

The BMC 50 is used to monitor parameter values of the second electronic device 200 when the BMC 50 is initialized. For example, the BMC 50 may monitor actual speed values of the fan 60 and temperature values of the second electronic device 200. The BMC 50 is initialized when the second electronic device 200 is powered on.

The monitoring system 10 is used to acquire actual speed values of the fan 60 from the BMC 50, and monitor the fan 60 by reference to the actual speed values. In some embodiments, the monitoring system 10 may be invoked when the second electronic device 200 is being tested (e.g., function test of the CPU). Details will be given in the following paragraphs.

In one embodiment, the first electronic device 100 is in communication with the BMC 50 through a serial port 1. In another embodiment, the first electronic device 100 is in communication with the BMC 50 through a network 2. When the BMC 50 is initialized, the BMC 50 notifies the first electronic device 100 that it is operational after booting through the serial port 1. Then the monitoring system 10 acquires completion time of initialization of the BMC 50, and controls the BMC 50 to return parameter values (e.g., the actual speed values of the fan 60) and temperature values of the second electronic device 200 through the serial port 1 or the network 2.

In some embodiments, a voltage sensor 40 is connected to the first and second electronic device 100, 200 through a universal serial bus (USB) cable 4 and a lead 3, respectively, to detects changes of voltage values of the second electronic device 200.

In this embodiment, the first electronic device 100 and the voltage sensor 40 use a USB protocol to achieve time synchronization when the voltage sensor 40 detects that voltage values of the second electronic device 200 are changed from high to low. The first electronic device 100 obtains changed time through the USB protocol, and the monitoring system 10 records the changed time to be boot time of the second electronic device 200.

The first electronic device 100 and the second electronic device 200 are generally controlled and coordinated by well known operating systems, or other compatible operating systems. All such operating systems control and schedule computer processes for execution, perform memory management, provide a file system, networking, and I/O services, and provide a user interface, such as a graphical user interface (GUI), among other things.

Figure 2:
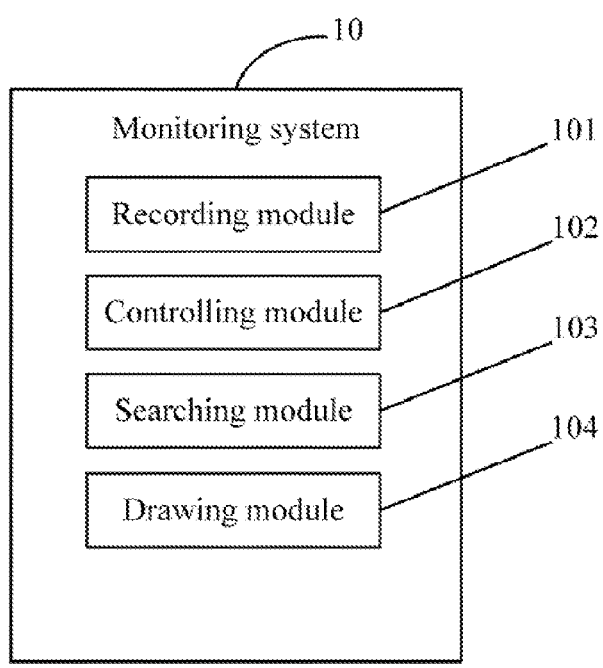
FIG. 2 is a block diagram of function modules of the monitoring system included in the first electronic device of FIG. 1.

FIG. 2 is a block diagram of function modules of the monitoring system 10 included in the first electronic device 100 of FIG. 1. In one embodiment, the monitoring system 10 may include a recording module 101, a controlling module 102, a searching module 103, and a drawing module 104. The modules 101-104 comprise computerized codes in the form of one or more programs that may be stored in the storage device 20. The computerized code includes instructions that are executed by the at least one processor 30.

Figure 3:
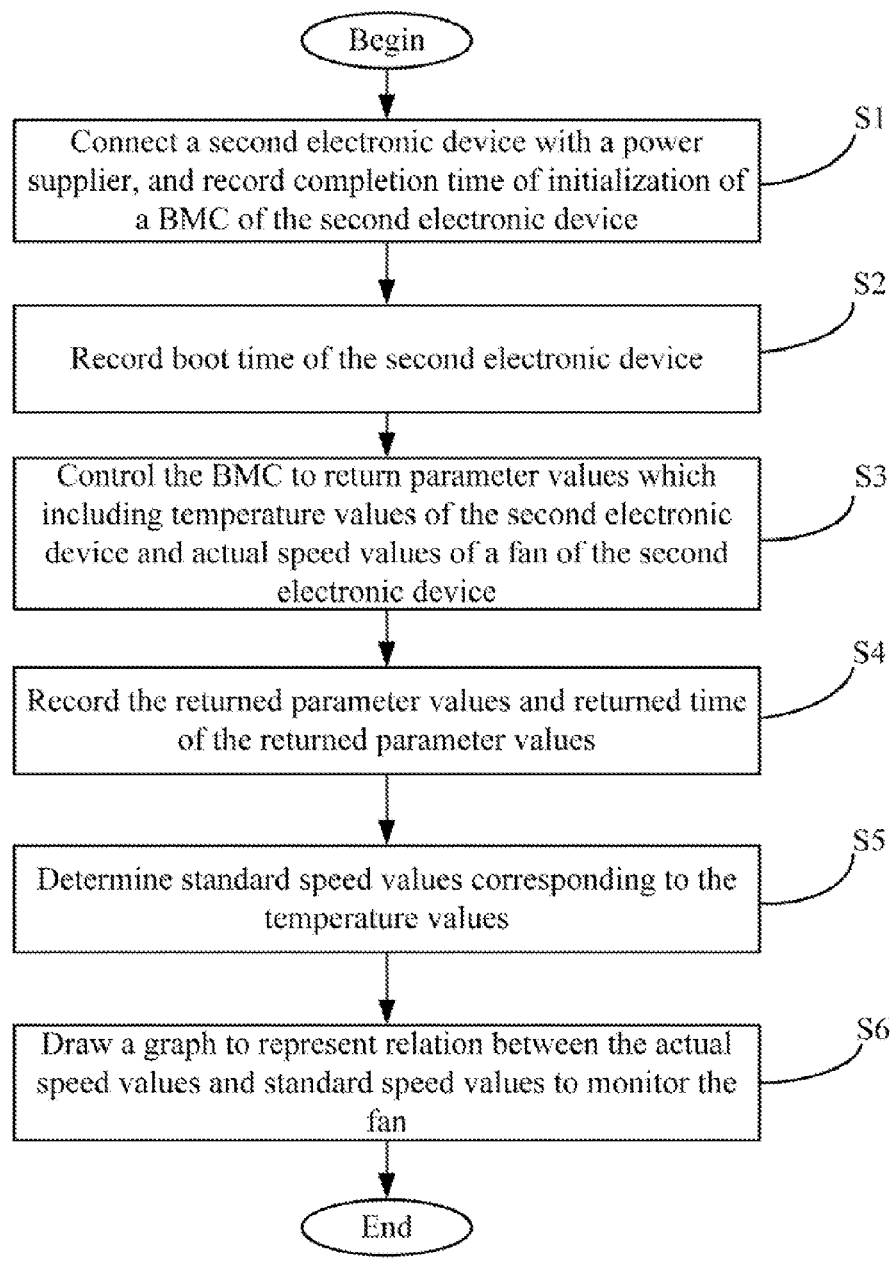
FIG. 3 is a flowchart of one embodiment of a monitoring method to monitor the fan of the second electronic device of FIG. 1.

FIG. 3 is a flowchart of one embodiment of a method to monitor the fan 60 of the second electronic device 200 of FIG. 1. Depending on the embodiment, additional steps may be added, others deleted, and the ordering of the steps may be changed.

In step S1, when the second electronic device 200 needs to be tested, the second electronic device 200 is connected to the power supply 70, then the BMC 50 is initialized. In one embodiment, when the BMC 50 completes the initialization process, the BMC 50 sends a completion notification to the first electronic device 100 to indicate that it is operational.

When the first electronic device 100 receives the completion notification, the recording module 101 acquires completion time of initialization of the BMC 50 through a serial port protocol, and records the completion time. For example, when the first electronic device 100 receives the completion notification at T minutes, the recording module 101 records that the BMC 50 has completed initialization at T minutes.

In step S2, the second electronic device 200 is booted to take the test (e.g., functional test of the CPU). For example, the tester may press a power button (not shown in FIG. 1) of the second electronic device 200 at (T+X) minutes to boot the second electronic device 200. The X minutes may be predetermined, such as 5 minutes. Then the voltage sensor 40 detects voltage values of the second electronic device 200 being changed from high to low.

In this embodiment, the first electronic device 100 and the voltage sensor 40 use the USB protocol to achieve time synchronization. When the voltage sensor 40 detects voltage values of the second electronic device 200 are changed from high to low, the recording module 101 obtains changed time from the USB cable 4, and records the changed time to be boot time of the second electronic device 200. For example, the recording module 101 records the boot time of the second electronic device 200 is at (T+5) minutes.

In step S3, the controlling module 102 controls the BMC 50 to return parameter values at each preset time interval (e.g., 5 minutes). The returned parameter values may include, but are not limited to the temperature values of the second electronic device 200 and the actual speed values of the fan 60 corresponding to the temperature values.

The controlling module 102 controls the BMC 50 to return parameter values through the serial port 1 or the network 2.

In step S4, the recording module 101 records the returned parameter values and the returned time of the returned parameter values. For example, as shown in FIG. 4, the recording module 101 records that the BMC 50 returns a temperature value (23° C.) and an actual speed value (4800 revolutions per second (RPS)) under the temperature value (23° C.) at (T+10) minutes.

In step S5, the searching module 103 determines standard speed values corresponding to the temperature values in the fan table, which includes the plurality of standard speed values of the fan 60 corresponding to different temperature value. For example, the searching module 103 determines a standard speed value (4800 RPS) when the temperature value of the second electronic device 200 is 23° C. As shown in FIG. 6, the searching module 103 determines a plurality of standard speed values corresponding to different temperature values of the second electronic device 200, from the returned time (T+10) minutes to (T+30) minutes.

In step S6, the drawing module 104 draws a graph to represent a relation between the actual speed values and the determined standard speed values corresponding to the returned time, and monitor the fan 60 according to the graph.

Figure 7:
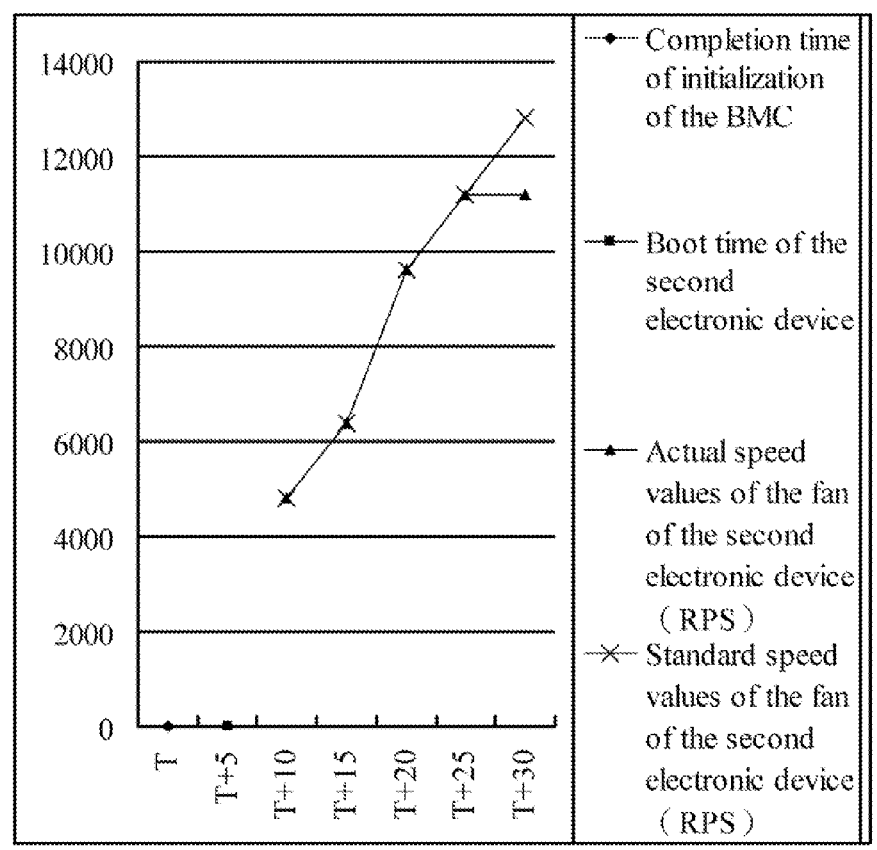

For example, as shown in FIG. 7, the drawing module 104 draws the graph to represent the relation between the actual speed values and the determined standard speed values, corresponding to the returned time from (T+10) minutes to (T+30) minutes. In one embodiment, the graph further represents completion time of initialization of the BMC 50 and the boot time of the second electronic device 200.

As shown in FIG. 7, it can be determined that the BMC 50 completes the initialization at T minutes, and the boot time of the second electronic device 200 is at (T+5) minutes. The fan 60 runs at an actual speed value of 11200 RPS which is lower than the standard speed value of 12800 RPS at (T+30) minutes. If a test result shows that the CPU working abnormally at (T+30) minutes, according to the graph, it can be considered that the fan 60 does not run at the standard speed value.

Although embodiments of the present disclosure have been specifically described, the present disclosure is not to be construed as being limited thereto. Various changes or modifications may be made to the present disclosure without departing from the scope and spirit of the present disclosure.

What is claimed is:

1. A first electronic device in communication with a second electronic device, comprising:
   a storage device;
   at least one processor; and
   one or more programs that are stored in the storage device and are executed by the at least one processor, the one or more programs comprising:
   a controlling module that controls a baseboard management controller (BMC) of the second electronic device to return parameter values, the returned parameter values including temperature values of the second electronic device, and actual speed values of a fan of the second electronic device corresponding to the temperature values;
   a recording module that records the returned parameter values and returned time of the returned parameter values;
   a searching module that determines standard speed values corresponding to the temperature values in a prestored fan table, which comprises a plurality of standard speed values of the fan corresponding to different temperature values; and a drawing module that draws a graph representing a relation between the actual speed values and the determined standard speed values corresponding to the returned time to monitor the fan.

2. The first electronic device of claim 1, wherein the recording module further records completion time of initialization of the BMC, and boot time of the second electronic device.

3. The first electronic device of claim 2, wherein the first electronic device is in communication with the BMC through a serial port, the recording module acquires the completion time of initialization of the BMC through the serial port.

4. The first electronic device of claim 3, wherein the controlling module controls the BMC to return parameter values through the serial port, and the recording module acquires the returned parameter values and the returned time through the serial port.

5. The first electronic device of claim 2, wherein the first electronic device is in communication with the BMC through a network, the controlling module controls the BMC to return parameter values through the network, and the recording module acquires the returned parameter values and the returned time through the network.

6. The first electronic device of claim 2, wherein the first electronic device is in communication with a voltage sensor through a universal serial BUS (USB) cable, and the voltage sensor is in communication with the second electronic device through a lead, the first electronic device and the voltage sensor use a USB protocol to achieve time synchronization, when the voltage sensor detects that voltage values of the second electronic device are changed from high to low, the recording module obtains the changed time from the USB cable, and records the changed time to be the boot time of the second electronic device.

7. A non-transitory storage medium having stored thereon instructions that, when executed by a processor of a first electronic device, causes the first electronic device to perform a method of monitoring a fan of a second electronic device, which is in communication with the first electronic device, the method comprising:
  controlling a baseboard management controller (BMC) of the second electronic device to return parameter values, the returned parameter values including temperature values of the second electronic device, and actual speed values of a fan of the second electronic device corresponding to the temperature values;
  recording the returned parameter values and returned time of the returned parameter values;
  determining standard speed values corresponding to the temperature values in a prestored fan table, which comprises a plurality of standard speed values of the fan corresponding to different temperature values; and
  drawing a graph representing a relation between the actual speed values and the determined standard speed values corresponding to the returned time to monitor the fan.

8. The non-transitory storage medium according to claim 7, wherein the first electronic device records completion time of initialization of the BMC, and boot time of the second electronic device.

9. The non-transitory storage medium according to claim 8, wherein the first electronic device is in communication with the BMC through a serial port, the first electronic device acquires the completion time of initialization of the BMC through the serial port.

10. The non-transitory storage medium according to claim 9, wherein the first electronic device controls the BMC to return parameter values through the serial port, and acquires the returned parameter values and the returned time through the serial port.

11. The non-transitory storage medium according to claim 8, wherein the first electronic device is in communication with the BMC through a network, the first electronic device controls the BMC to return parameter values through the network, and acquires the returned parameter values and the returned time through the network.

12. The non-transitory storage medium according to claim 8, wherein the first electronic device is in communication with a voltage sensor through a universal serial BUS (USB) cable, and the voltage sensor is in communication with the second electronic device through a lead, the first electronic device and the voltage sensor use a USB protocol to achieve time synchronization, when the voltage sensor detects that voltage values of the second electronic device are changed from high to low, the first electronic device obtains changed time from the USB cable, and records the changed time to be the boot time of the second electronic device.

13. A method of monitoring a fan of a second electronic device, a first electronic device comprises a storage device, and at least one processor, the method comprising:
  controlling a baseboard management controller (BMC) of the second electronic device to return parameter values, the returned parameter values including temperature values of the second electronic device, and actual speed values of a fan of the second electronic device corresponding to the temperature values;
  recording the returned parameter values and returned time of the returned parameter values;
  determining standard speed values corresponding to the temperature values in a prestored fan table, which comprises a plurality of standard speed values of the fan corresponding to different temperature values; and
  drawing a graph representing a relation between the actual speed values and the determined standard speed values corresponding to the returned time to monitor the fan.

14. The method according to claim 13, wherein the first electronic device records completion time of initialization of the BMC, and boot time of the second electronic device.

15. The method according to claim 14, wherein the first electronic device is in communication with the BMC through a serial port, the first electronic device acquires the completion time of initialization of the BMC through the serial port.

16. The method according to claim 15, wherein the first electronic device controls the BMC to return parameter values through the serial port, and acquires the returned parameter values and the returned time through the serial port.

17. The method according to claim 14, wherein the first electronic device is in communication with the BMC through a network, the first electronic device controls the BMC to return parameter values through the network, and acquires the returned parameter values and the returned time through the network.

18. The method according to claim 14, wherein the first electronic device is in communication with a voltage sensor through a universal serial BUS (USB) cable, and the voltage sensor is in communication with the second electronic device through a lead, the first electronic device and the voltage sensor use a USB protocol to achieve time synchronization, when the voltage sensor detects that voltage values of the second electronic device are changed from high to low, the first electronic device obtains changed time from the USB cable, and records the changed time to be the boot time of the second electronic device.

* * * * *